US006006783A

United States Patent [19]

Lühmann et al.

[11] Patent Number: 6,006,783

[45] Date of Patent: Dec. 28, 1999

[54] MAGNETICALLY ACTUATABLE VALVE

[75] Inventors: Bernd Lühmann, Usingen; Bernhard Zervas, Oberursel, both of Germany

[73] Assignee: Vickers Systems GmbH, Bad Homburg, Germany

[21] Appl. No.: 09/005,519

[22] Filed: Jan. 12, 1998

Related U.S. Application Data

[63] Continuation of application No. 08/637,461, Apr. 25, 1996, abandoned, which is a continuation of application No. 08/408,361, Mar. 22, 1995, abandoned, which is a continuation of application No. 08/199,374, Feb. 18, 1994, abandoned.

[51] Int. Cl.[6] .......................... F15B 13/044; F16K 31/06

[52] U.S. Cl. .................. 137/625.65; 137/554; 251/129.1

[58] Field of Search .............................. 137/625.65, 554; 251/129.1

[56] References Cited

U.S. PATENT DOCUMENTS

| | | | |
|---|---|---|---|
| 5,348,047 | 9/1994 | Stoll et al. | 137/554 |

FOREIGN PATENT DOCUMENTS

| | | | |
|---|---|---|---|
| 1906884 | 9/1970 | Germany | 251/129.1 |
| 58-24694 | 5/1983 | Japan . | |
| 60-20865 | 6/1985 | Japan . | |
| 62-152203 | 7/1987 | Japan . | |
| 3-134383 | 6/1991 | Japan . | |
| 4-290684 | 10/1992 | Japan . | |

*Primary Examiner*—Gerald A. Michalsky
*Attorney, Agent, or Firm*—Dinsmore & Shohl LLP

[57] ABSTRACT

The invention deals with a magnetically actuatable valve, in particular a hydraulic valve, with a piston guided inside of a body for establishing at least one flow-through connection, with the piston being effectively connected with two electromagnets with electric junctions and disposed on both sides of the basic body, and with the electric connection of the electromagnets being established by a sole central junction plug which is electrically connected and mechanically fixed with contact pins disposed on the electromagnets.

17 Claims, 1 Drawing Sheet

MAGNETICALLY ACTUATABLE VALVE

RELATED APPLICATIONS

This application is a continuation of application Ser. No. 08/637,461, filed Apr. 25, 1996, (now abandoned) which is a continuation of application Ser. No. 08/408,361, filed Mar. 22, 1995 (now abandoned), which is a continuation of application Ser. No. 08/199,374, filed Feb. 18, 1994 (now abandoned).

FIELD OF THE INVENTION

The present invention deals with a magnetically actuatable valve, especially a hydraulic valve.

BACKGROUND OF THE INVENTION

Using a magnetically actuatable hydraulic valve, for instance, in machine tools is known. The magnetic valves assume the control function of functional installations disposed in machine tools, for instance, the displacing movements or clamping and similar functions.

The valve typically comprises electromagnets attached on both sides of a basic member, which are in actuating connection with a piston disposed inside the basic member. Depending upon which of the two magnets has been activated, the magnetic force moves the piston into the one or other direction and thereby opens flow through apertures through which hydraulic liquid, for instance, can flow in the different directions, which again causes the movement of the installations mentioned above, for instance, by piston-cylinder units.

The electromagnets are herein controlled from a central point, preferably an operator's control panel, wherein each of the two magnets is connected with the operator's panel through an electrical apparatus plug-in connection and the electric connection cable located thereon.

Herein, it is disadvantageous that two connecting cables have to be laid for switching such a hydraulic valve on. The cables comprise separate plug-in connecting elements and thus entail an additional cabling effort during installation of the valves. Furthermore, additional installation spaces have to be provided for the two apparatus plug-in connections.

It is therefore an object of the invention to create a magnetically actuatable valve of the generic species, which is simply structured and can be installed without large cable laying effort.

SUMMARY OF THE INVENTION

These and other objects of the invention, which shall become hereafter apparent, are achieved by a magnetically actuatable valve, wherein the electric connection of the two electromagnets is established by a junction plug which is electrically connected and mechanically fixed by contact pins disposed on the electromagnets. By the invention, a magnetically actuatable valve, especially a hydraulic valve comprising two electromagnets can move a piston guided in the basic member into different shift positions, and can therefore be wired and controlled by only one cable. Both magnets can thereby be actuated by one junction plug, which is wired by only one cable to an operator's control panel.

By integrating the junction plug advantageously into the entire valve in a positively locked manner, improved installation conditions result in the utilization since less installation room is required, for instance, when installing the unit in machine tools.

As an expedient, the junction plug is configured as a separate unit disposed externally and preferably above the basic member of the valve. Herein, the junction plug comprises plug-in contacts on both sides allocated to the electromagnet. By designing the junction plug separately, a preliminary cable connection with the junction cable and the plug-in unit can be performed and that the magnetic valve, which has to be connected thereto, can be assembled later.

In another refinement of the invention, the electromagnets contact the base member of the valve with one end face. The end face however is extended at least on one side beyond the basic member and is equipped with contact pins which are allocated to the plug-in contacts on the junction plug. By this preferred embodiment, the entire magnetically actuatable valve has a pleasant design and additionally, at the same time, retains the junction plug by the electromagnet, which is to attached. Thus the disposition of additional plug-in connectors or distributors is avoided.

Another aspect of the invention is that the junction plug includes integrated light-emitting diodes, which indicate, for instance, the real time switching condition of the magnetic valve. This allows the operator immediately to recognize whether the magnetic valve is in an open or closed position, wherein the momentary position must be previously allocated to the magnets contacting the valve on both sides.

In addition, it is expediently possible to dispose an integrated switch output amplifier and/or an integrated proportional valve amplifier into the junction plug. Thus, the magnets can be directly switched by a small available switching output.

BRIEF DESCRIPTION OF THE DRAWINGS

The invention will be better understood by the Detailed Description of the Preferred Embodiment, with reference to the drawings, wherein.

DETAILED DESCRIPTION OF THE PREFERRED EMBODIMENT

Figure 1:
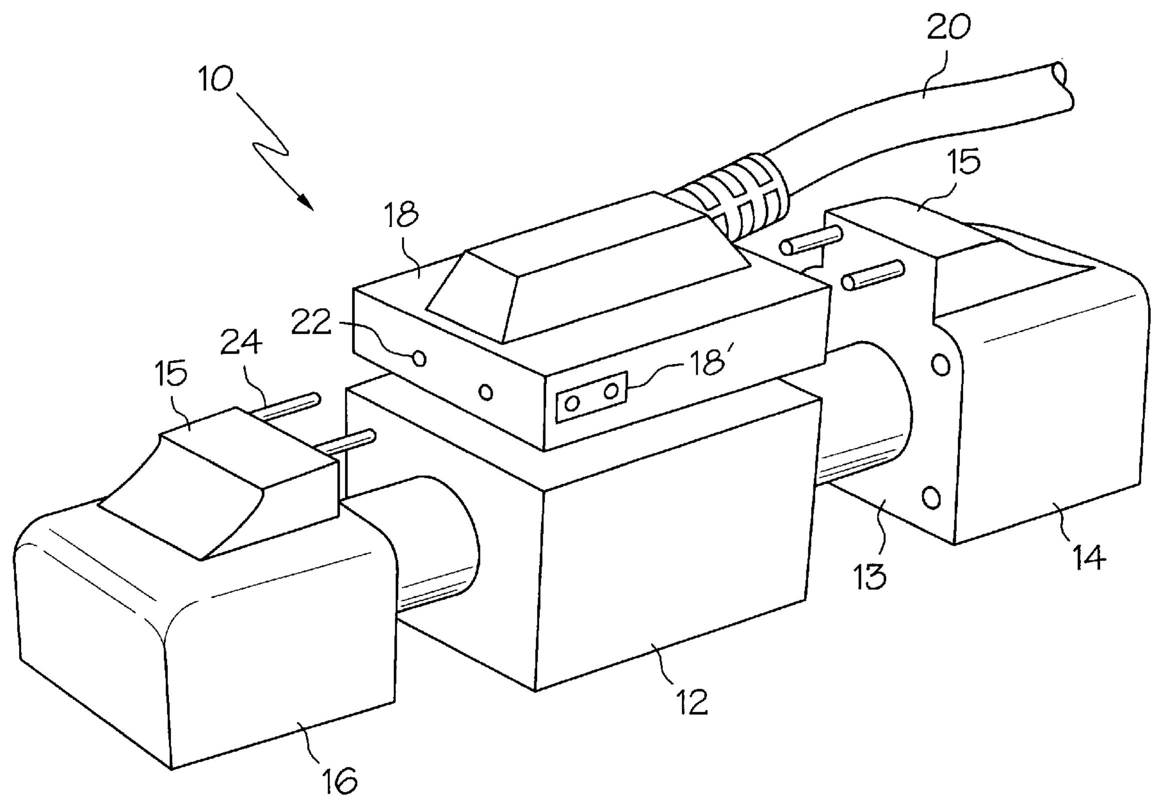
FIG. 1 is perspective view of a magnetically actuatable valve.

Referring now to the drawings, wherein like numerals reflect like elements through the two views, FIG. 1 depicts an electromagnet hydraulic valve, comprising a body member 12 and electromagnets 14 and 16 disposed on opposite sides thereof. The valve 10 has a junction plug 18 above the body 12 connected to a junction cable 20. The junction plug 18 and the body 12 have bases lying parallel to one another and have preferably identical external dimensions. The junction plug 18 has plug-in contacts 22 at the end faces of the junction plug 18, allocated to the electromagnets 14 and 16. The junction plug 18 further includes integrated light-emitting diodes $\mathbf{18}^1$ which, as it has already been discussed above, indicate the real time switching condition of the magnetic valve. Still further, the junction plug 18 may include an integrated switch output amplifier and/or a proportional valve amplifier 18*a*, which permits direct switching of the magnets by a small switching output. The electromagnets 14 and 16 have contact pins 24 matching the plug-in contacts 22. The end faces 13 of the electromagnets 14 and 16 resting at the body 12 are extended beyond the body, so that the electromagnets 14 and 16 have a region 15, where the contact pins 24 are disposed.

Figure 2:
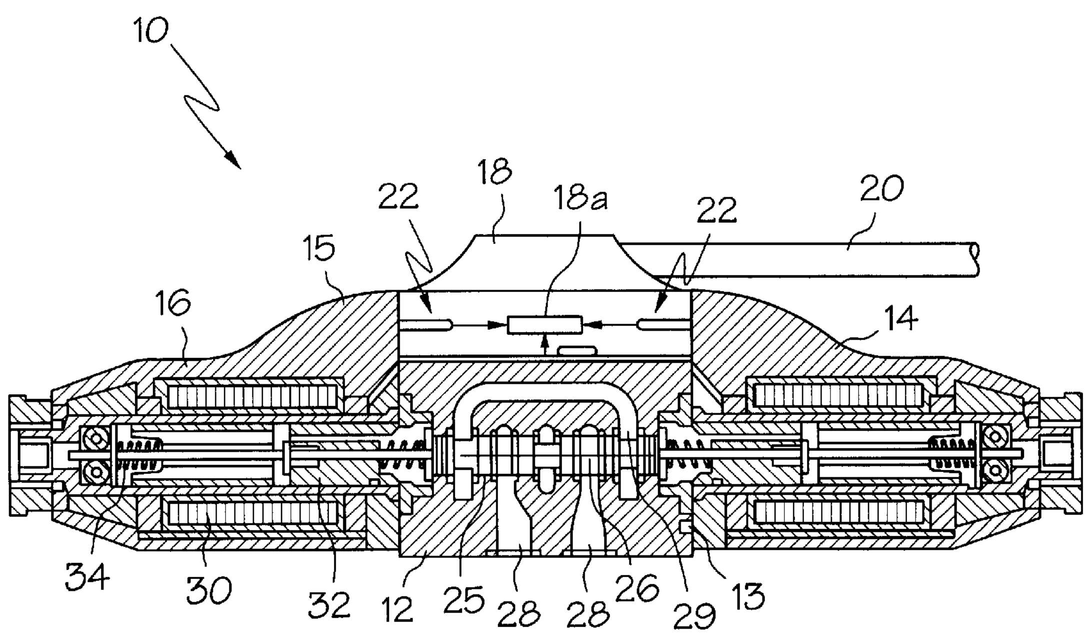
FIG. 2 is a cross-sectional view through a magnetically actuatable valve in detailed construction.

FIG. 2 shows the valve 10, in the assembled state in side view, wherein the junction plug 18 is shown in outline form.

The basic body 12 with the electromagnets 14 and 16 disposed at its side faces are also discernible in this figure. The side faces 13 of the electromagnets 14 and 16 are extended beyond the basic body and receive the junction plug 18 between themselves. The contact pin 24 of the electromagnets 14 and 16 engage in the assembled state into the plug-in contacts 22 of the junction plug 18. The mechanical fixation of the junction plug 18 is achieved by means of this electric contact arrangement.

The electromagnets 14 and 16 are identically constructed in a mirror-image fashion. They have a coil 30 embracing an armature 32. The armature 32 can be moved in axial direction against the force of a restoring member, preferably a spring 34.

The basic body 12 of the valve 10 comprises a piston 26, guided in a mobile manner in a channel 25. The channel 25 and the piston 26 are aligned with armatures 32, guided in the electromagnets 14 and 16. The basic member 12 comprises furthermore inlet and outlet apertures 28, as well as a connecting channel 29.

The electromagnet valve fulfills the following functions, wherein only the bare essentials will be provided when explaining the proper valve effect.

An electrically conducting connection between the switches (disposed on an operator's control panel) and the electromagnets 14 and 16 is established by the contact pins 24 and the plug-in contacts 22 in the finished assembled state. This is achieved by the junction plug 18 being connected by the junction cable 20, with an operator's control panel comprising switches (not shown). Depending upon which operating function is to be established by the valve 10, the coil 30 of the electromagnet 14 or the coil 30 of the electromagnetic 16 is activated. Herein the coil 30 builds up a magnetic field which moves the armature 32 axially, guided inside the coil. This axial displacement of the armature 32 the piston 26 guided in the channel 25 is simultaneously displaced axially. The piston 26 comprises through-apertures in such a way that they establish a circulation cycle through the connecting channel 29 with the inlet and outlet apertures 28 after the axial displacement has occurred.

Thus, depending upon which of the electromagnets 14 or 16 has been activated, an oppositely directed circulation cycle, in the example a hydraulic circulation cycle is established by a corresponding, otherwise caused axial displacement of the armature 32 and the piston 26.

A compact and sturdy constructional form is achieved by the designs of the regions 15, molded to the electromagnets 14 and 16, which enables a space-saving installation of the entire valve. At the same time, mechanical fixation of the junction plug 18 is achieved in addition to sound electrical contracting.

While the preferred embodiment of the invention has been depicted in detail, modifications and adaptations may be made thereto, without departing from the spirit and scope of the invention, as delineated in the following claims.

What is claimed is:

1. A magnetically actuatable valve, comprising:

a basic body;

a piston displaceable in the basic body for establishing at least one flow-through connection;

two electromagnets disposed on opposite sides of the basic body for displacing the piston in opposite directions;

a junction plug supported on the basic body and arranged between the two electromagnets for feeding electrical power to the two electromagnets, said junction plug being formed as a separate unit and being provided, on opposite end faces thereof, with plug-in contacts allocated to the two electromagnets, respectively; and contact pins provided on respective end faces of the two electromagnets facing respective end faces of the junction plug, the contact pins engaging into respective plug-in contacts provided on the opposite end faces of the junction plug, wherein the mechanical engagement of the contact pins within the plug-in contacts is adapted to both retain the junction plug on the basic body and electrically connect the two electromagnets to an electrical power source when the valve is in its assembled state, the junction plug being otherwise substantially unrestricted for movement away from the basic body such that the junction plug is held to the basic body without a fastening element.

2. The magnetically actuatable valve of claim 1, wherein said junction plug is connected to an electric junction cable.

3. The magnetically actuatable valve of claim 1, wherein said junction plug comprises light-emitting diodes indicating a shifted position.

4. The magnetically actuatable valve of claim 1, wherein said junction plug comprises an integrated switching output amplifier.

5. The magnetically actuatable valve of claim 1, wherein said junction plug comprises an integrated proportional valve amplifier.

6. The magnetically actuatable valve of claim 1, wherein the distance between the opposite end faces of the junction plug is substantially equivalent to the distance between the opposite sides of the basic body, wherein each of the end faces of the two electromagnets engages an opposite side of the basic body and has a portion extending beyond the opposite side, and wherein the contact pins are provided on the extending portions of the end faces of the two electromagnets.

7. The magnetically actuatable valve of claim 6, wherein said junction plug is located on a top of said basic body.

8. A magnetically actuatable valve, comprising:

two electromagnets, each having an inner face;

a basic body provided between the inner faces of the two electromagnets, the basic body having an upper surface;

a moveable piston provided within the basic body;

a junction plug provided on the upper surface of the basic body and between the inner faces of the two electromagnets, the junction plug having two oppositely disposed end faces, each end face being adjacent a portion of the side face of one of the electromagnets, and each end face having a pair of electrical receptacles; and a pair of contact pins extending from the inner face of each electromagnet, wherein each contact pin is configured to engage an electrical receptacle of the junction plug and to electrically connect thereto, and wherein the mechanical interference of the contact pins within the electrical receptacles is adapted to also substantially restrict movement of the junction plug in a direction away from the basic body, and the inner faces of the electromagnets are adapted to restrict movement of the junction plug between the electromagnets, the junction plug being otherwise substantially unrestricted for movement away from the basic body such that the junction plug is held to the basic body without a fastening element.

9. The magnetically actuatable valve as recited in claim 8, wherein the junction plug comprises light-emitting diodes adapted to indicate the position of the piston.

10. The magnetically actuatable valve as recited in claim 8, wherein the junction plug comprises an integrated switching output amplifier.

11. The magnetically actuatable valve as recited in claim 8, wherein the junction plug comprises an integrated proportional valve amplifier.

12. The magnetically actuatable valve as recited in claim 8, wherein the width of the basic body is substantially equivalent to the width of the junction plug.

13. A magnetically actuatable valve, comprising:

a basic body;

a piston provided within the basic body;

a pair of electromagnets disposed on opposite sides of the basic body and adapted to selectively displace the piston in opposite directions, each electromagnet having an inner face;

a junction plug provided on the basic body and between the two inner faces of the electromagnets, the junction plug comprising a pair of end faces, each end face being adjacent a portion of the inner face of one of the electromagnets, the junction plug being provided with a first electrical contact on each end face; and a second electrical contact provided on the inner face of each electromagnet, each second electrical contact being electrically connected to one of the first electrical contacts of the junction plug and mechanically engaged therewith to provide the sole restriction against movement of the junction plug in a direction away from the basic body, the junction plug being otherwise substantially unrestricted for movement away from the basic body.

14. The magnetically actuatable valve as recited in claim 13, wherein said junction plug comprises light-emitting diodes adapted to indicate the position of the piston.

15. The magnetically actuatable valve as recited in claim 13, wherein the junction plug comprises an integrated switching output amplifier.

16. The magnetically actuatable valve as recited in claim 13, wherein the junction plug comprises an integrated proportional valve amplifier.

17. The magnetically actuatable valve as recited in claim 13, wherein the width of the basic body is substantially equivalent to the width of the junction plug.

* * * * *